(12) United States Patent
Munguia

(10) Patent No.: US 12,281,734 B1
(45) Date of Patent: *Apr. 22, 2025

(54) AIR HOSE GUIDE

(71) Applicant: Auto Crane Company, Tulsa, OK (US)

(72) Inventor: Ulisses Munguia, Tulsa, OK (US)

(73) Assignee: Auto Crane Company, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,169

(22) Filed: Jan. 22, 2024

Related U.S. Application Data

(63) Continuation of application No. 17/562,661, filed on Dec. 27, 2021, now Pat. No. 11,879,577.

(51) Int. Cl.
| | |
|---|---|
| *B65H 75/44* | (2006.01) |
| *F16L 3/01* | (2006.01) |
| *F16L 5/00* | (2006.01) |

(52) U.S. Cl.
CPC .......... *F16L 3/012* (2013.01); *B65H 75/4402* (2013.01); *B65H 75/4471* (2013.01); *F16L 5/00* (2013.01)

(58) Field of Classification Search
CPC .............. B65H 75/425; B65H 75/4256; B65H 75/4402; B65H 75/4421; B65H 75/4426; B65H 75/4471; Y10T 137/6899; Y10T 137/6918–6962; F16L 3/012; F16L 5/00
See application file for complete search history.

(56) References Cited

U.S. PATENT DOCUMENTS

| | | | |
|---|---|---|---|
| 4,343,420 A | 8/1982 | Scott | |
| 4,685,634 A | 8/1987 | Schwartz | |
| 4,846,090 A | 7/1989 | Palmquist | |
| 5,566,898 A | 10/1996 | Cline | |
| 5,568,824 A * | 10/1996 | Cordrey | B65H 75/38 |
| | | | 137/355.27 |
| 5,732,898 A * | 3/1998 | Odessky | B65H 75/4402 |
| | | | 242/379.2 |
| 6,109,544 A | 8/2000 | Sheng | |
| 6,926,027 B1 * | 8/2005 | Sorensen | B65H 75/425 |
| | | | 137/355.23 |
| 7,096,813 B1 * | 8/2006 | Luck | B65H 75/4421 |
| | | | 114/230.23 |
| 9,403,662 B1 | 8/2016 | Evans et al. | |
| 9,505,583 B1 * | 11/2016 | Hellbusch | B65H 75/425 |
| 11,879,577 B1 * | 1/2024 | Munguia | B65H 57/14 |

* cited by examiner

*Primary Examiner* — Kevin F Murphy
(74) *Attorney, Agent, or Firm* — GableGotwals

(57) ABSTRACT

A hose guide having a base with a back side, a front side and a hose receiving orifice. A receiver extends from the front side of the base. The receiver has a terminal end that communicates an interior surface and an exterior surface. The terminal end may define a plurality of fillets. A roller assembly is affixed to the back side the base. The roller assembly supports a plurality of rollers for engaging an external surface of a hose. When installed, the hose guide of the invention is flush with a sealing surface, such as a panel, for providing a sealing surface therewith. Rollers are provided for reducing damage to a hose passing therethrough. Use of a complementary shaped stopper helps to prevent an ingress of water and dust through the hose guide, e.g., into a hose reel containing compartment.

15 Claims, 7 Drawing Sheets

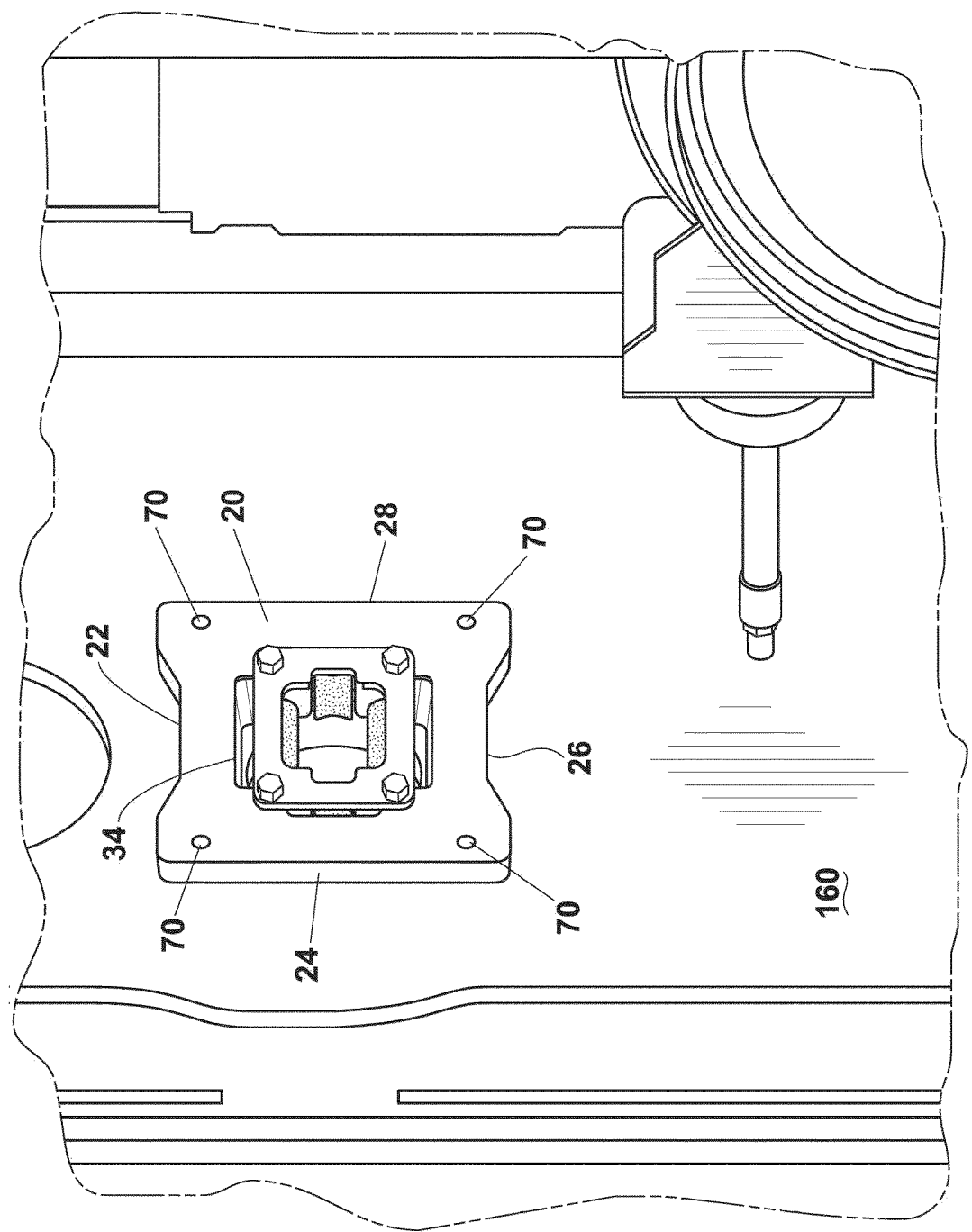

AIR HOSE GUIDE

CROSS REFERENCE TO CO-PENDING APPLICATIONS

This application is a continuation of U.S. application Ser. No. 17/562,661, filed Dec. 27, 2021, the content of which is incorporated by reference herein.

FIELD OF THE DISCLOSURE

A hose guide for reducing wear on a hose passing through an orifice. More particularly, the hose guide of this disclosure reduces wear on a hose and prevents an ingress of dust and moisture into a compartment.

BACKGROUND

Hose guides allow a hose to pass through an orifice and facilitate reduced wear on the hose, e.g., by providing rollers in the hose guide. Potential drawbacks associated with the use of a hose guide include the fact that a hose guide may allow dust and moisture to pass through an orifice into a compartment, e.g., into a compartment of a hose carrying vehicle.

SUMMARY

Embodiments of an air hose guide of this disclosure includes a base, which is arranged for connection to a wall or panel of a vehicle or container, a frusto-conical shaped receiver integral to and protruding outward of a front side of the base, and a roller assembly toward a backside of the base. When installed, a portion of the base is flush with the wall or panel. The receiver tapers toward the roller assembly and its opening is sized to accommodate a predetermined size of air hose and air hose stopper. The roller assembly includes two, spaced apart, horizontally oriented, non-grooved rollers—one located at a top and another located at a bottom of the roller assembly—and two, spaced apart, vertically oriented, grooved rollers, each shorter in length than the non-grooved rollers, located on each side of the roller assembly, the grooves being sized for, and complementary in shape to, that of the air hose. The roller assembly prevents damage to the hose as it passes therethrough. Use of a complementary shaped stopper helps to prevent an ingress of water and dust through the hose guide and into a hose reel containing compartment. The stopper is of a kind known in the art, as is the air hose and hose reel.

Embodiments of a hose guide of this disclosure have a base having a front panel-engaging side, a hose receiving orifice, and a back side. A frusto-conical shaped receiver extends from the front panel-engaging side. The receiver has an interior surface defining an orifice and tapering toward the back side. The orifice is in communication with the hose-receiving orifice of the base. In one embodiment, the receiver has an exterior surface and a terminal end. The terminal end communicates the interior surface and the exterior surface. In one embodiment, the terminal end defines a plurality of fillets.

A roller assembly is affixed to the back side the base. The roller assembly includes a bracket that supports a plurality of rollers for engaging an external surface of the air hose. In one embodiment, the roller assembly supports four rollers, two of which are grooved, two of which are not grooved, the grooved rollers being shorter than, and arranged orthogonal to, the non-grooved rollers. The hose passes through the roller assembly and through the receiver. The groove provides a concave surface for the hose.

In one embodiment, a stopper of a kind known in the art is provided on the air hose or received by the air hose. The stopper may be a rubber stopper and has a first surface having a complementary shape with respect to an interface surface between the terminal end and the interior surface of the receiver. The stopper has a first side for engaging the receiver and preventing an ingress of dust and moisture into the hose guide.

In one embodiment, the hose guide is installed on a panel as part of a hose carrying vehicle or compartment of the vehicle. The panel has an external side and an internal side. The panel defines an orifice for receiving the hose guide. In one embodiment, the front panel-engaging side of the base engages the internal side of the panel and the receiver protrudes outwardly from the external side of the panel for forming a water-tight assembly.

BRIEF DESCRIPTION OF THE DRAWINGS

FIG. 8 is a perspective view of the hose guide of FIG. 1 installed on an interior surface of the panel of a reel containing compartment.

DETAILED DESCRIPTION

Figure 1:
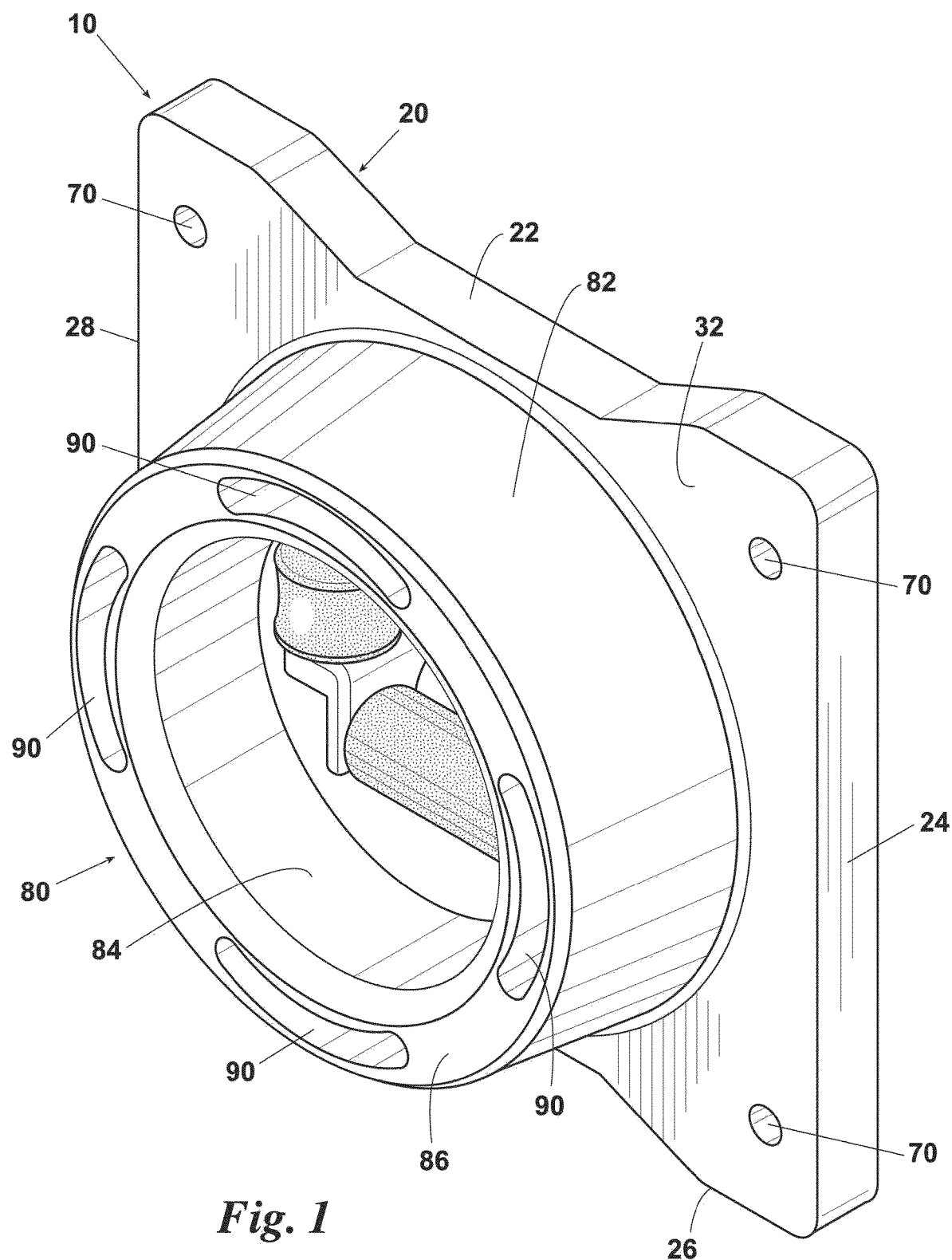
FIG. 1 is perspective view of an embodiment of hose guide of this disclosure.
Figure 2:
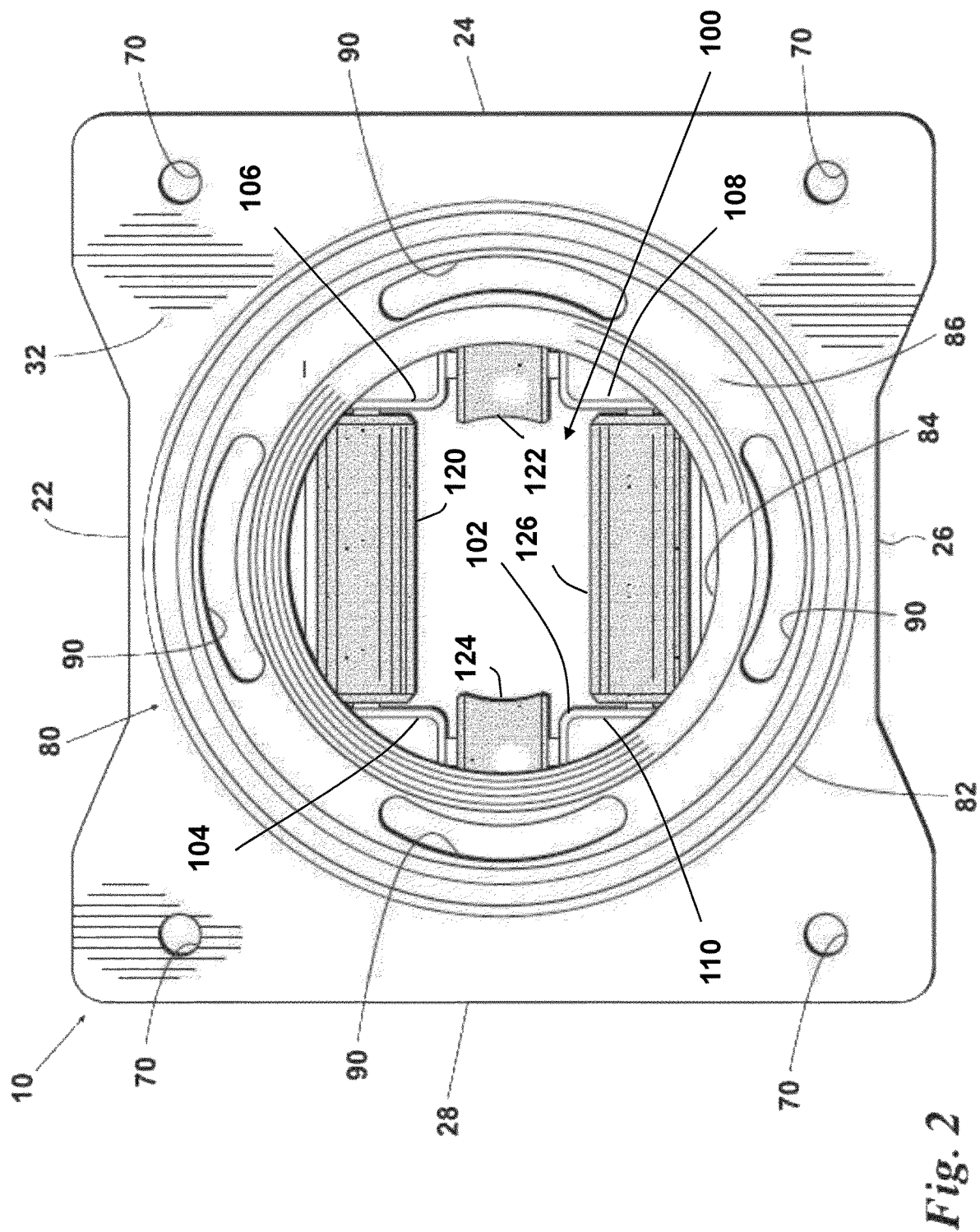
FIG. 2 is an elevation view of a front side of the hose guide of FIG. 1.
Figure 3:
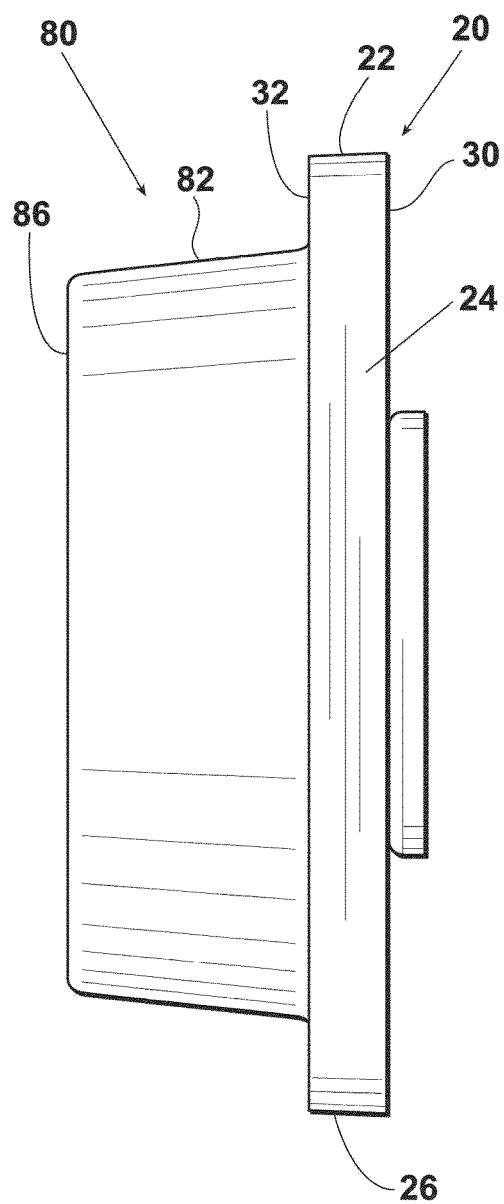
FIG. 3 is a side elevation view of the hose guide of FIG. 1.
Figure 6:
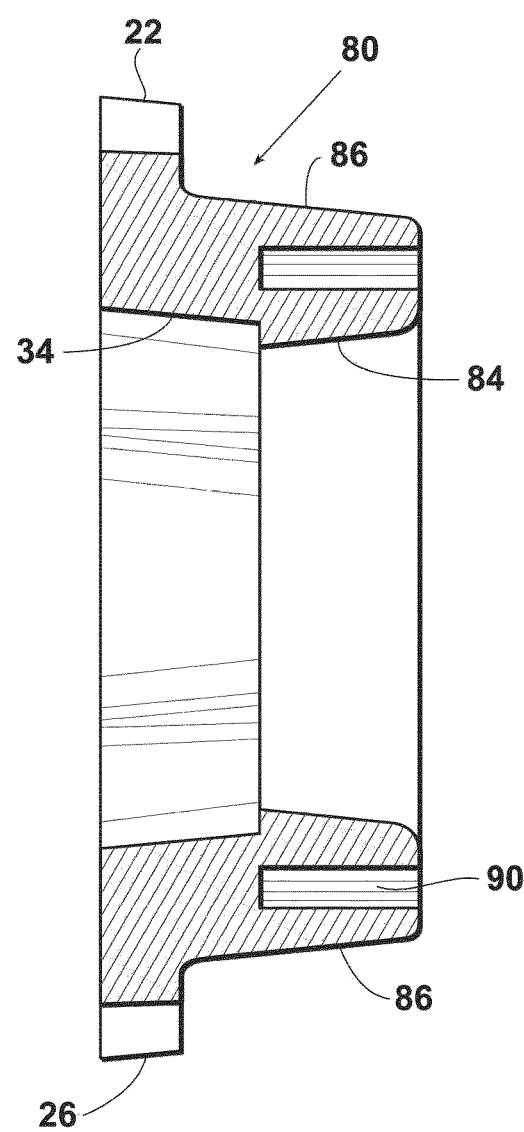
FIG. 6 is a cross-sectional side elevation view of the hose guide of FIG. 1.
Figure 4:
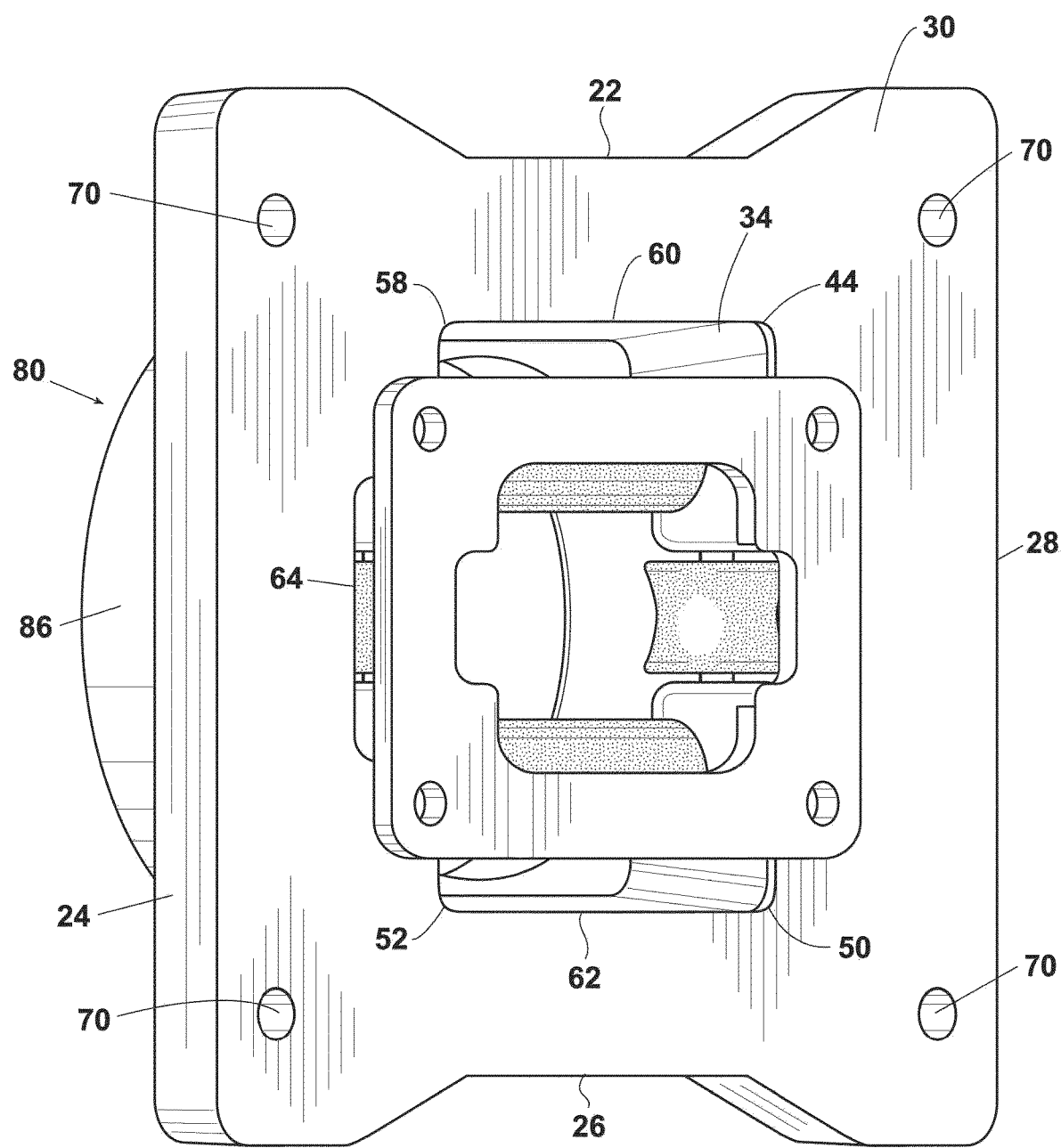
FIG. 4 is rear elevation view of the hose guide of FIG. 1.

Referring now to the drawings, shown are embodiments of an air hose guide designated generally 10. Air hose guide 10 includes base 20. In one embodiment, base 20 is square or substantially square, having four sides 22, 24, 26, 28. Two of the sides 24, 28 may be straight sides. Another of the two sides 24, 26 may have an elongated U-shape, being concave or lower in a middle portion than at each end. In one embodiment, opposing sides 22, 26 and 24, 28 may be spaced about six inches apart. Base 20 defines back side 30 and front side 32. Base 20 additionally defines orifice 34 coaxial with a hose-receiving orifice of the guide 10.

Figure 5:
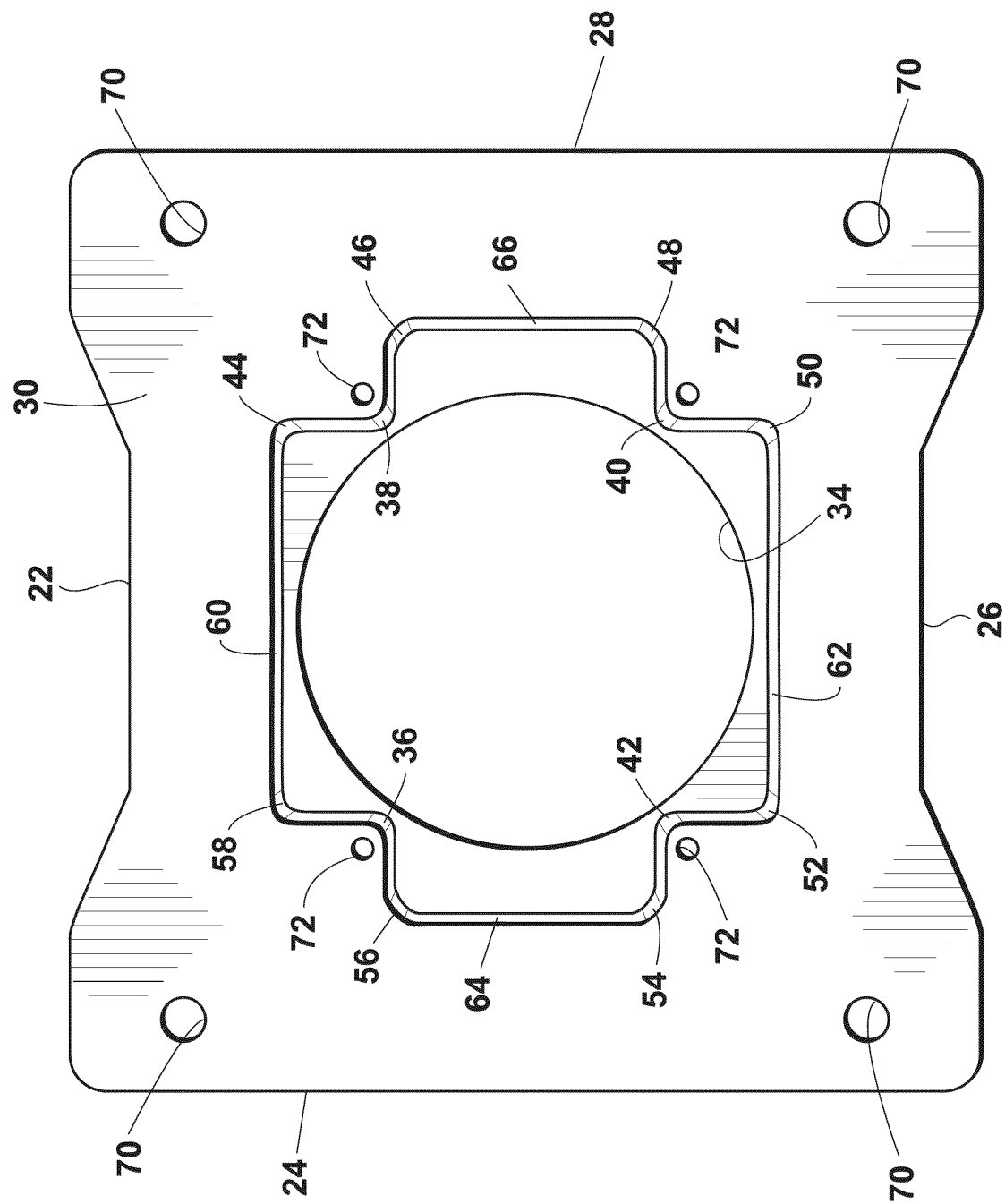
FIG. 5 is a rear elevation view of the hose guide of FIG. 1 with the roller assembly removed.

In one embodiment, orifice 34 serves means to carry a roller assembly 100, forming a plus-sign shape having two horizontal surfaces 60, 62 and two vertical surfaces 64, 68. One horizontal surface 60 forms exterior corners 58, 44 at its corresponding ends and the other horizontal surface 62 forms exterior corners 50, 52 at its corresponding ends. These corners 44, 58, 50, 52 are shared with a corresponding one of the vertical surfaces 64, 68. Unlike the horizontal surfaces 60, 62 which run straight between the exterior corners 44, 58 and 50, 52 respectively, the vertical surfaces 64, 68 do not. The orifice 34 may have four rounded interior corners 36, 38, 40, 42 (see, e.g., FIG. 5) and eight rounded exterior corners 44, 46, 48, 50, 52, 54, 56, 58 (see, e.g., FIG. 5).

In one embodiment, horizontal surfaces 60, 62 are spaced about two to five inches apart, e.g., 3¼ to 3½ inches apart, and vertical surfaces 64, 66 are spaced about two to six inches apart, e.g., 4 inches apart. Right upper interior corner 38 and lower left interior corner 42 are spaced apart greater than a diameter of hose to be received therein. In one embodiment, right upper interior corner 38 is greater than 3 inches apart from left lower interior corner 42. Similarly, left upper interior corner 36 is greater than a hose diameter away from lower right interior corner 40.

Base 20 additionally defines four securing orifices 70 that pass through base 20. In one embodiment, securing orifices 70 are spaced three to seven inches apart, e.g., about 5.25 inches apart. Base 20 additionally defines four roller assembly securing orifices 72.

Receiver 80 extends from front side 32 of base 20. Receiver 80 has an exterior surface 82 and an interior surface 84. Exterior surface 82 and interior surface 84 are separated at a terminal end by end surface 86. Interior surface 84 is sized to have a diameter greater than that of a hose to be received therein. Interior surface 84 may be tapered adjacent to end surface 86. In one embodiment, interior surface 84 has a diameter of two to five inches, e.g., 3⅛ to 3¼ inches.

In one embodiment, end surface 86 defines a plurality of fillets 90. The receiver 80 provides a circular-shaped hose-receiving orifice.

A roller assembly 100 has base 102 and projecting roller mounts 104, 106, 108 and 110. Roller mount 104 is received adjacent to interior corner 36 of base 20. Roller mount 106 is received adjacent to interior corner 38 of base 20. Roller mount 108 is received adjacent to interior corner 40 of base 20. Roller mount 110 is received adjacent to interior corner 42 of base 20. Upper roller 120 spans between roller mounts 104 and 106. Right roller 122 spans between roller mounts 106 and 108. Lower roller 126 spans between roller mounts 108 and 110. Left roller 124 spans between roller mounts 110 and 104. Rollers 122, 124 may be pulley-shaped and include a groove sized for a predetermined diameter or range of hose 130. In embodiments, rollers 120, 126 do not include the groove.

Hose 130 is typically received on spool 140 that is received within a container or vehicle. hose 130 passes through hose guide 10 and may carry a ball or puck 150. Ball or puck 150 is preferably sized and shaped to be received within interior surface 84 of receiver 80 for forming a snug fit therein.

Figure 7:
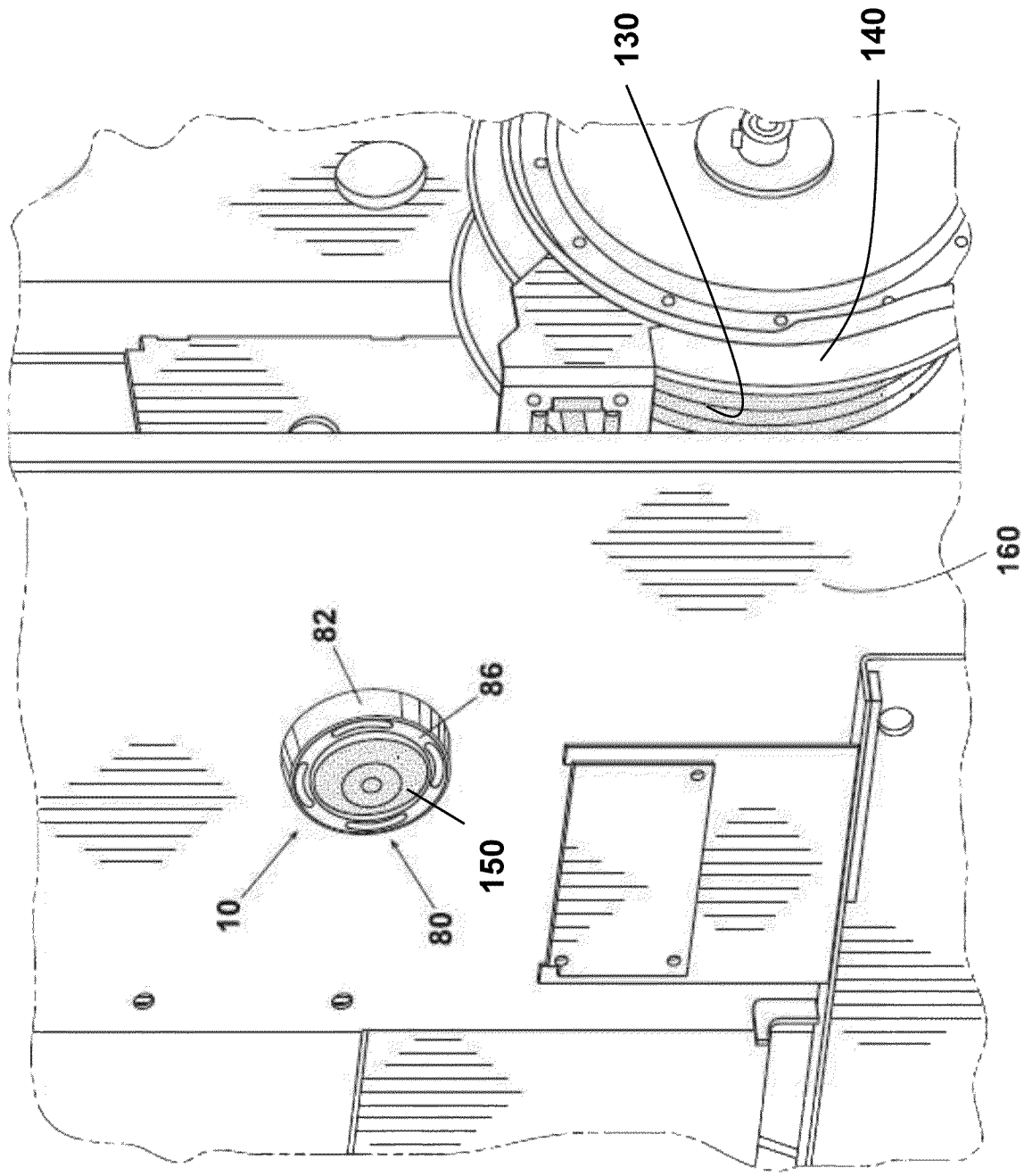
FIG. 7 is a perspective view of the hose guide of FIG. 1 installed on an exterior surface of a panel of a reel containing compartment with a stopper received in the hose guide.

In use, hose guide 10 is secured to panel 160 (FIGS. 7, 8), e.g., to a wall of a vehicle or container via fasteners received within securing orifices 70. Front side 32 of base 20 of hose guide 10 is mated against an inside surface of the wall (see, e.g., FIG. 8). Receiver 80 is located to pass through an orifice in panel 160 of the vehicle or container where it is exposed to the outside (see, e.g., FIG. 7). Hose 130 is passed through roller assembly 100 and through receiver 80 where the hose exits hose guide 10 for use. Hose 130 may disengage ball or puck 150 and carry ball or puck 150 proximate a tip of hose 130. Upon retraction of hose 130, ball or puck 150 is again received within receiver 80 for preventing an ingress of water or dust within the vehicle or container.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A hose guide comprising:
   a base having a back side, a front panel-engaging side, and a hose-receiving orifice;
   a receiver including a terminal end and an interior surface, the terminal end extending outward of the front panel-engaging side of the base, the interior surface tapering toward the back side of the base and defining an orifice in communication with the hose-receiving orifice of the base;
   a hose stopper including a surface shaped complementary to at least one of a portion of the interior surface and an interface between the terminal end and the interior surface; and;
   a roller assembly supporting a plurality of rollers for engaging an external surface of a hose, two rollers of the plurality each including a groove and spaced opposite one another, another two rollers of the plurality not including the groove and spaced opposite one another.

2. The hose guide of claim 1, further comprising:
   the roller assembly affixed to the back side the base.

3. The hose guide of claim 2, further comprising a hose passing through the roller assembly.

4. The hose guide of claim 1, the two grooved rollers of the plurality having a first length, the two non-grooved rollers of the plurality have a second length different than that of the first length.

5. The hose guide of claim 4, the second length being greater than the first length.

6. A hose guide comprising:
   a receiver having a frusto-conical shape;
   a hose stopper including a surface shaped complementary to at least one of a portion of the frusto-conical shape and a terminal end of the frusto-conical shape; and
   a roller assembly supporting a plurality of rollers for engaging an external surface of a hose, two rollers of the plurality each including a groove and spaced opposite one another, another two rollers of the plurality not including the groove and spaced opposite one another.

7. The hose guide of claim 6, further comprising:
   a base having a back side, a front panel-engaging side, and a hose-receiving orifice;
   the terminal end of the receiver extending outward of the front panel-engaging side of the base, the frusto-conical shape tapering toward the back side of the base and defining an orifice in communication with the hose-receiving orifice of the base.

8. The hose guide of claim 7, further comprising:
   the roller assembly affixed to the back side the base.

9. The hose guide of claim 8, the two grooved rollers of the plurality having a first length, the two non-grooved rollers of the plurality have a second length different than that of the first length.

10. The hose guide of claim 9, the second length being greater than the first length.

11. The hose guide of claim 8, further comprising a hose passing through the roller assembly.

12. A method for preventing moisture and debris from entering an exterior facing side of a hose guide on a panel of a vehicle, the hose guide including a base having a back side, a front panel-engaging side, and a hose-receiving orifice, the method comprising:
   providing the hose guide with a receiver having a frusto-conical shape and a hose stopper including a surface shaped complementary to at least one of a portion of the frusto-conical shape and a terminal end of the frusto-conical shape.

13. The method of claim 12, wherein the terminal end of the receiver extends outward of the front panel-engaging side of the base, the frusto-conical shape tapers toward the back side of the base and defines an orifice in communication with the hose-receiving orifice of the base.

14. The method of claim 12, wherein the back side of the base includes a roller assembly supporting a plurality of rollers for engaging an external surface of a hose, two rollers of the plurality each including a groove and spaced opposite one another, another two rollers of the plurality not including the groove and spaced opposite one another.

15. A compartment containing a hose reel, the compartment comprising:
   a panel defining an orifice;
   a hose guide affixed to the panel, the hose guide including:
      a base having a back side, a front panel-engaging side and a hose-receiving orifice;
      a receiver having a frusto-conical shape, a terminal end of the receiver extending outward of the front panel-engaging side of the base;
      a hose stopper including a surface shaped complementary to at least one of a portion of an interior surface of the frusto-conical shape and a terminal end of the frusto-conical shape; and
      a roller assembly connected to the back side of the base and supporting a plurality of rollers for engaging an external surface of a hose, two rollers of the plurality each including a groove and spaced opposite one another, another two rollers of the plurality not including the groove and spaced opposite one another.

* * * * *